(12) United States Patent
Jeong et al.

(10) Patent No.: US 10,476,052 B2
(45) Date of Patent: Nov. 12, 2019

(54) BATTERY PACK

(71) Applicant: LG ELECTRONICS INC., Seoul (KR)

(72) Inventors: Sooji Jeong, Seoul (KR); Dalhyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 215 days.

(21) Appl. No.: 15/617,293

(22) Filed: Jun. 8, 2017

(65) Prior Publication Data

US 2017/0358784 A1    Dec. 14, 2017

(30) Foreign Application Priority Data

Jun. 8, 2016    (KR) .................. 10-2016-0070941

(51) Int. Cl.

| H01M 2/10 | (2006.01) |
|---|---|
| H01M 2/04 | (2006.01) |
| H01M 2/20 | (2006.01) |
| H01M 2/34 | (2006.01) |
| H01M 10/647 | (2014.01) |

(Continued)

(52) U.S. Cl.
CPC ....... *H01M 2/1016* (2013.01); *H01M 2/0482* (2013.01); *H01M 2/0486* (2013.01); *H01M 2/1005* (2013.01); *H01M 2/1077* (2013.01); *H01M 2/202* (2013.01); *H01M 2/345* (2013.01); *H01M 10/613* (2015.04); *H01M 10/647* (2015.04); *H01M 10/6555* (2015.04);

(Continued)

(58) Field of Classification Search
None
See application file for complete search history.

(56) References Cited

U.S. PATENT DOCUMENTS

| 8,927,126 B2 | 1/2015 | Kim |
|---|---|---|
| 2009/0258283 A1 | 10/2009 | Kim |

(Continued)

FOREIGN PATENT DOCUMENTS

| DE | 10-2008-016936 | 10/2008 |
|---|---|---|
| DE | 102008016936 | 10/2008 |

(Continued)

OTHER PUBLICATIONS

European Office Action in European Application No. 17172360.4, dated May 29 2018, 9 pages.

(Continued)

*Primary Examiner* — Daniel S Gatewood
(74) *Attorney, Agent, or Firm* — Fish & Richardson P.C.

(57) ABSTRACT

A battery pack includes a plurality of battery modules in a stacked arrangement. The plurality of battery modules includes a first battery module that includes: at least one battery cell including a cell lead; a cartridge on which the at least one battery cell is mounted; and a first cooling cover. The first cooling cover is coupled to the cartridge and covers the at least one battery cell. The cartridge includes: a seating portion on which the at least one battery cell is seated; and a pressing portion that is formed on the seating portion and that is configured to, based on an external force being applied to the seating portion, apply pressure to a first end of a second cooling cover of a second battery module that neighbors the first battery module in the stacked arrangement.

14 Claims, 17 Drawing Sheets

(51) Int. Cl.
  *H01M 10/6555* (2014.01)
  *H01M 10/613* (2014.01)
(52) U.S. Cl.
  CPC ...... *H01M 2/1061* (2013.01); *H01M 2200/20* (2013.01); *H01M 2220/20* (2013.01)

(56) References Cited

U.S. PATENT DOCUMENTS

| | | | | |
|---|---|---|---|---|
| 2011/0059347 A1* | 3/2011 | Lee | ................ | H01M 2/0277 |
| | | | | 429/120 |
| 2013/0273412 A1* | 10/2013 | Okada | ............... | H01M 2/206 |
| | | | | 429/158 |
| 2016/0254504 A1* | 9/2016 | Kim | ................ | H01M 2/1061 |
| | | | | 429/99 |

FOREIGN PATENT DOCUMENTS

| | | | | | |
|---|---|---|---|---|---|
| DE | 102008016936 A1 | * | 10/2008 | ........ | H01M 2/1077 |
| EP | 2343754 | | 7/2011 | | |
| EP | 2763214 | | 8/2014 | | |
| EP | 2763214 A1 | * | 8/2014 | ........ | H01M 10/625 |
| EP | 3002804 | | 4/2016 | | |
| EP | 3002804 A1 | * | 4/2016 | ........ | H01M 10/0525 |
| EP | 3062361 | | 8/2016 | | |
| KR | 10-2009-0108418 | | 10/2009 | | |
| KR | 20110018260 A | | 2/2011 | | |
| KR | 20120020048 A | | 3/2012 | | |
| KR | 10-2013-0086677 | | 8/2013 | | |
| KR | 20140042059 | | 5/2014 | | |
| KR | 10-2015-0047030 | | 5/2015 | | |
| KR | 20150050449 A | * | 5/2015 | ........ | H01M 2/1061 |
| KR | 10-2015-0132903 | | 11/2015 | | |
| KR | 20150050449 | | 9/2016 | | |

OTHER PUBLICATIONS

Extended European Search Report in European Application No. 17172360.4, dated Aug. 2, 2017, 9 pages (with English translation).

* cited by examiner

BATTERY PACK

CROSS-REFERENCE TO RELATED APPLICATIONS

The present application claims priority under 35 U.S.C. 119 and 35 U.S.C. 365 to Korean Patent Application No. 10-2016-0070941, filed on Jun. 8, 2016, which is hereby incorporated by reference in its entirety.

TECHNICAL FIELD

The present disclosure relates to a battery pack.

BACKGROUND

A battery pack is a device that typically includes a plurality of battery cells that assembled as a unit and supply power for use in various industrial fields, such as mobile terminals, home appliances, and automobiles.

In some scenarios, a battery pack may be mounted on and used in an electric vehicle by a driving force outputted from a driving motor. A battery pack may be configured by coupling a plurality of battery modules with each other. Each battery module may include at least one battery cell.

SUMMARY

Implementations are disclosed herein that provide a battery pack in which a plurality of battery modules are stacked.

In one aspect, a battery pack may include a plurality of battery modules in a stacked arrangement. The plurality of battery modules may include a first battery module that includes: at least one battery cell including a cell lead; a cartridge on which the at least one battery cell is mounted; and a first cooling cover. The first cooling cover may be coupled to the cartridge and may cover the at least one battery cell. The cartridge may include: a seating portion on which the at least one battery cell is seated; and a pressing portion that is formed on the seating portion and that is configured to, based on an external force being applied to the seating portion, apply pressure to a first end of a second cooling cover of a second battery module that neighbors the first battery module in the stacked arrangement.

In some implementations, the cartridge may further include: a supporting portion that is formed on the seating portion and that is spaced apart the pressing portion and supports a second end of the second cooling cover of the second battery module that neighbors the first battery module in the stacked arrangement.

In some implementations, the pressing portion and the supporting portion may be projected to face one surface of the seating portion and to face each other.

In some implementations, the cooling cover may include: a heat conductive plate that faces the at least one battery cell; and at least one fastening plate that is bent at the heat conductive plate and that has a detachable portion that is detachable from the cartridge. The heat conductive plate may be positioned between the pressing portion and the supporting portion of the cartridge.

In some implementations, the pressing portion of the cartridge may face a first end of the heat conductive plate of the cooling cover. The supporting portion of the cartridge may face a second end of the heat conductive plate of the cooling cover.

In some implementations, at least one of the pressing portion or the supporting portion of the cartridge may be formed to be elongated in a perpendicular direction to a longitudinal direction of the cartridge.

In some implementations, the cooling cover may define at least one hole.

In some implementations, the at least one hole may be formed to be elongated in a perpendicular direction to a longitudinal direction of the cooling cover.

In some implementations, the at least one hole may include a plurality of holes that are spaced apart in a perpendicular direction to a longitudinal direction of the cooling cover.

In some implementations, the cooling cover may include: a heat conductive plate that faces the at least one battery cell; and at least one fastening plate that is bent at the heat conductive plate and that has a detachable portion that is detachable from the cartridge. The at least one hole may be formed on at least one of the fastening plate or the heat conductive plate.

In some implementations, the at least one battery cell may include a main body and a cell lead connected to the main body. A stepped portion may be formed in the seating portion of the cartridge. The stepped portion may define a space by which the cell lead is movable in a stacking direction of the at least one battery cell or in a perpendicular direction to the stacking direction of the at least one battery cell.

In some implementations, the stepped portion may face at least a portion of the cell lead.

In some implementations, the at least one battery cell may include a first battery cell that is seated on the cartridge and a second battery cell that is in contact with the cooling cover. Each of the plurality of battery modules may further include a secondary cartridge positioned between the first battery cell and the second battery cell. The secondary cartridge may be configured to apply pressure on the first battery cell and the second battery cell in a state in which an external force is applied to the battery module.

In some implementations, the first battery module may further include a buffering member that is disposed between the first battery cell and the second battery cell.

In some implementations, the secondary cartridge may be disposed in parallel to the cartridge.

In some implementations, the at least one battery cell of the first battery module may include: a main body connected to the cell lead of the at least one battery cell; and a first exterior material that surrounds a portion of the cell lead and the main body of the first battery module. The cartridge of the first battery module may further include a projection portion that bends an edge portion of a second exterior material of the second battery module that neighbors the first battery module in the stacked arrangement.

In some implementations, the battery pack may further include a separator provided between a pair of battery modules among the plurality of battery modules. At least one battery cell of the pair of battery modules may include: a main body; a cell lead that is connected to the main body; and an exterior material that surrounds a portion of the cell lead and the main body. The separator may further include a projection portion that bends the edge portion of the exterior material.

In some implementations, the battery pack may further include an insulating sheet disposed between an end plate and the cooling cover of an outermost battery module among the plurality of battery modules in the stacked arrangement. At least one battery cell of the outermost battery module may include: a main body; a cell lead that is connected to the main body; and an exterior material that surrounds a portion of the cell lead and the main body. The insulating sheet may further include a projection portion that bends the edge of the exterior material.

In another aspect, a battery pack may include a plurality of battery modules in a stacked arrangement. At least one battery module of the plurality of battery modules may include: at least one battery cell comprising a cell lead; a cartridge on which the at least one battery cell is mounted; and a cooling cover. The cooling cover may be coupled to the cartridge and may cover the at least one battery cell. The cartridge may further include: a seating portion on which the at least one battery cell is seated; and a pressing portion that is formed on the seating portion and that is configured to apply pressure to a first end of the cooling cover in a state in which an external force is applied to the seating portion.

In some implementations, the cartridge may further include: a supporting portion that is formed to be spaced apart from the pressing portion and that supports a second end of the cooling cover.

The foregoing general description and the following detailed description are exemplary and explanatory and are intended to provide further explanation of the subject matter claimed.

DETAILED DESCRIPTION

Implementations described herein provide a battery pack with at least one battery cell, and more specifically a battery pack configured to mitigate short-circuits of a battery cell and a cooling cover in scenarios where impact is applied to the battery pack.

Each battery cell of a battery pack may include a cell lead. The battery pack may further include a bus bar that interconnects the cell leads. The battery cells may be connected in series or in parallel by the bus bar.

The battery pack may also include a cooling cover for cooling heat generating in the battery cell.

In some scenarios, there is a risk that the battery pack may become deformed in shape when impact is applied to the outside of the battery pack. In such scenarios of impact, components within the battery pack may be shifted or rearranged, and in particular, a battery cell may become short-circuited with the cooling cover due to the impact.

In scenarios where a battery cell and the cooling cover are short-circuited with respect to each other, various additional risks may be created, such as sparks or a fire.

Implementations described herein provide a battery pack that is configured to mitigate such risks. Hereinafter, some examples of implementations will be described in detail with reference to the drawings. However, implementations are not limited to these examples.

Figure 1:
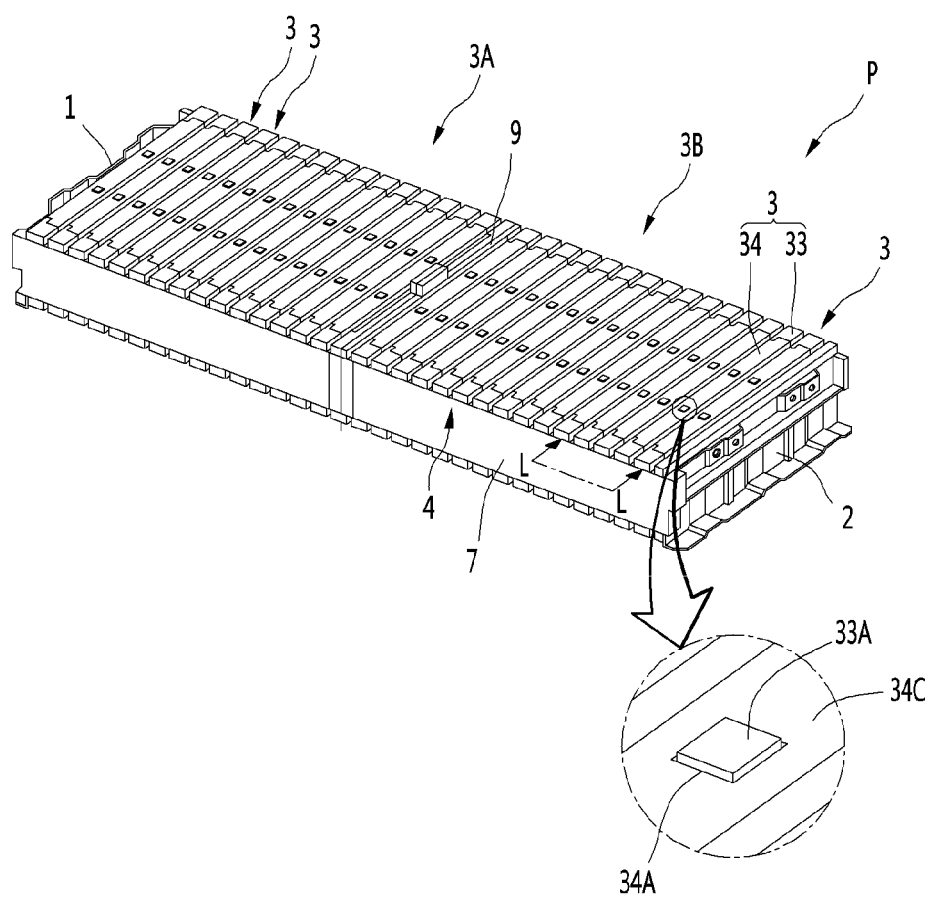
FIG. 1 is a diagram illustrating an example of a perspective view illustrating a battery pack according to an implementation.
Figure 2:
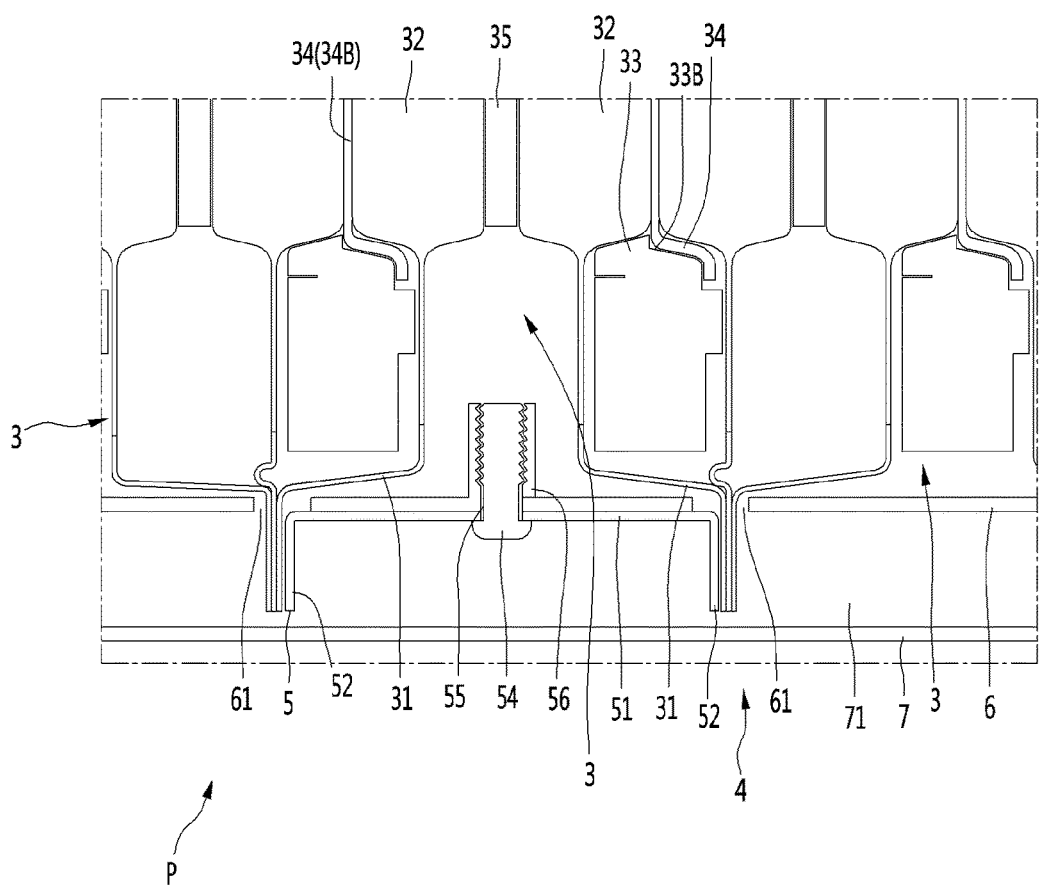
FIG. 2 is a diagram illustrating an example of a cross-sectional view of the battery module and a connecting board assembly in FIG. 1.

FIG. 1 is an example of a perspective view illustrating a battery pack according to an implementation, and FIG. 2 is an example of a cross-sectional view illustrating the battery module and a connecting board assembly in FIG. 1, viewed from a top perspective relative to FIG. 1.

As shown in FIG. 1, the battery pack P may include a pair of end plates 1 and 2, and a plurality of battery modules 3 which are disposed between the pair of end plates 1 and 2.

The plurality of battery modules 3 may be disposed to be stacked between the pair of end plate 1 and 2. For example, the plurality of battery modules 3 may be disposed to be stacked between the pair of end plate 1 and 2 in the horizontal direction and in the perpendicular direction to the each other.

The plurality of battery modules 3 may be divided into a number of groups divided by at least one separator. The example of FIG. 1 illustrates two battery module groups 3A and 3B that are separated by a separator 9. As such, the battery pack P may include a separator 9 that divides group 3A from group 3B.

Each battery module 3 may include a cartridge 33 and a cooling cover 34, and a battery cell (e.g., battery cell 32 in FIG. 2) may be disposed between the cartridge 33 and the cooling cover 34.

With further reference to FIG. 1, a projection 33A may be formed on any one of the cartridge 33 or the cooling cover 34. A projection coupling hole 34A, into which the projection 33A is inserted, may be formed in the other of the cartridge 33 or the cooling cover 34. For example, if the projection 33A is formed on a fastening plate 34C of the cooling cover 34, then the projection coupling hole 34A, into which the projection 33A is inserted, may be formed in the cartridge 33. In contrast, if the projection coupling hole 34A is formed in the fastening plate 34C, then the projection 33A inserted into the projection coupling hole 34A may be formed on the cartridge 33.

As such, the fastening plate 34C may have a detachable portion that is detachable from the cartridge 33.

FIG. 2 illustrates an example of a cross-sectional view of the battery pack P, viewed from a top perspective relative to FIG. 1. Each battery module 3 may include at least two battery cells 32, with a buffer member 35 disposed between the at least two battery cells 32. The buffer member 35 may be made of, for example, an elastic material.

In the example of FIG. 2, each battery module 3 includes a pair of battery cells 32, where one of the battery cells 32 is seated to contact the cartridge 33 and the other of the battery cells 32 is seated to surface-contact the cooling cover 34.

Each battery cell 32 may include a cell lead 31, as illustrated in FIG. 2. The cell lead 31 may be a positive pole cell lead or a negative pole cell lead which is provided in the battery cell 32.

The cooling cover 34 may include a heat conductive plate 34B which faces one of the battery cells 32. The heat conductive plate 34B may include a flat part that surface-contacts the battery cell 32.

The cooling cover 34 may also include a fastening plate 34C (e.g., shown in FIG. 1) which is bent from the heat conductive plate 34B and is coupled with the cartridge 33.

As shown in FIG. 2, an opening or recess portion 33B, into which a cooling cover 34 of a neighboring battery module 3 is inserted, may be provided on the cartridge 33.

When the cartridge 33 and the cooling cover 34 are thus coupled, the cooling cover 34 and any one of the pair of the battery cells 32, the buffering member 35 and the other one of the pair of the battery cells 32, and the cartridge 33 are coupled with each other and thus may form a single battery module 3.

At least a portion of the cell lead 31 of the battery cell 32 is positioned at the outside of the cartridge 33 and the cooling cover 34. The cell lead 31 may be connected to a connecting board assembly 4.

The battery pack P may thus implement a connecting board assembly 4 to which a plurality of battery modules 3 are connected. The connecting board assembly 4 may be connected with the cell lead 31 and may connect with the plurality of battery cells 32 in series or in parallel.

As shown in FIG. 2, the battery pack P may also include a bus bar 5. The bus bar 5 may electrically interconnect different battery cells 32. In particular, in FIG. 2, the bus bar 5 is bonded to cell lead 31 of battery cell 32. The battery pack P may also include a connecting board 6 on which the bus bar 5 is mounted. The battery pack P may further include an outer cover 7 which covers the connecting board 6 and the bus bar 5.

The bus bar 5 may be mounted to the connection board 6 by various implementations. One example of this mounting is shown in FIG. 2 and described below, where the bus bar 5 is coupled to the connection board 6 by fastening member 54, which may be a screw, for example.

In the example of FIG. 2, bus bar 5 includes a fastening portion 51. A cell lead connecting portion 52 is provided on the fastening portion 51, to which the cell lead 31 is connected.

The fastening portion 51 may be fastened to the connecting board 6 using a latching mechanism, such as a hook or a fastening member 54 (e.g., a screw or other suitable fastening member). In such implementations, the fastening portion 51 may have a through hole 55 through which the fastening member 54 is passed. In addition, the connecting board 6 may have a fastening part 56 to which the fastening member 54 is fastened. The fastening part 56 may include a fastening mechanism (e.g., a boss or nut) through which the fastening member 54 is fastened (e.g., screw-fastened or nut-fastened).

In some implementations, the fastening portion 51 of bus bar 5 may have a plurality of cell lead connecting portions 52, e.g., at least one pair of cell lead connecting portions 52 as shown in FIG. 2.

The bus bar 5 may be electrically connected to the cell leads 31, and the cell leads 31 may be electrically interconnected to each other through the bus bar 5. The pair of cell lead connecting portions 52 may be provided to face each other, for example, by being bent to be perpendicular to the fastening portion 51 of bus bar 5.

As such, the bus bar 5 may be electrically connected to the cell leads 31 of the different battery cells 32. For example, the cell lead 31 of any of the plurality of battery cells 32 may be connected with any of the pair of cell lead connecting portions 52. The cell lead 31 of any the other battery cells 32 may be connected with the other of the pair of cell lead connecting portions 52.

The cell lead 31 and the bus bar 5 may be joined to transmit sufficient power while the cell lead 31 is connected to the bus bar 5. For example, in some implementations, the cell lead 31 may be joined to the bus bar 5 in an ultrasonic welding or a vibration welding manner.

In some scenarios, a plurality of bus bars 5 may be mounted to the connecting board 6. For example, a plurality of bus bars 5 may interconnect pairs of battery cells 32 in a plurality of battery modules 3. In such scenarios, the plurality of bus bars 5 may be spaced apart from each other in a parallel direction to a stacking direction of the battery module 3 and each other.

The connecting board 6 may be configured to be a plate shape body which is elongated in the parallel direction to the stacking direction of the plurality of battery modules 3.

In some implementations, as shown in FIG. 2, the connecting board 6 may have a through hole 61 through which the cell lead 31 of the battery cell 32 is passed.

A space 71 in which the bus bar 5 is housed may be provided between the connecting board 6 and the outer cover 7. As such, the bus bar 5 may be housed in the space 71 between the connecting board 6 and the outer cover 7 in a state where the bus bar 5 is mounted on the connecting board 6.

Upon assembly of the battery pack P, the bus bar 5 may be joined with the cell lead 31 of the battery cell 32 in a state where the bus bar 5 is fastened to the connecting board 6.

The outer cover 7 may be fastened to at least one of the end plates 1 and 2 illustrated in FIG. 1, the separator 9 and the connecting board 6.

The outer cover 7 is capable to protecting the bus bar 5 mounted on the connecting board 6. The outer cover 7 is capable to protecting the cell lead 31 positioning in the space 71.

Figure 3:
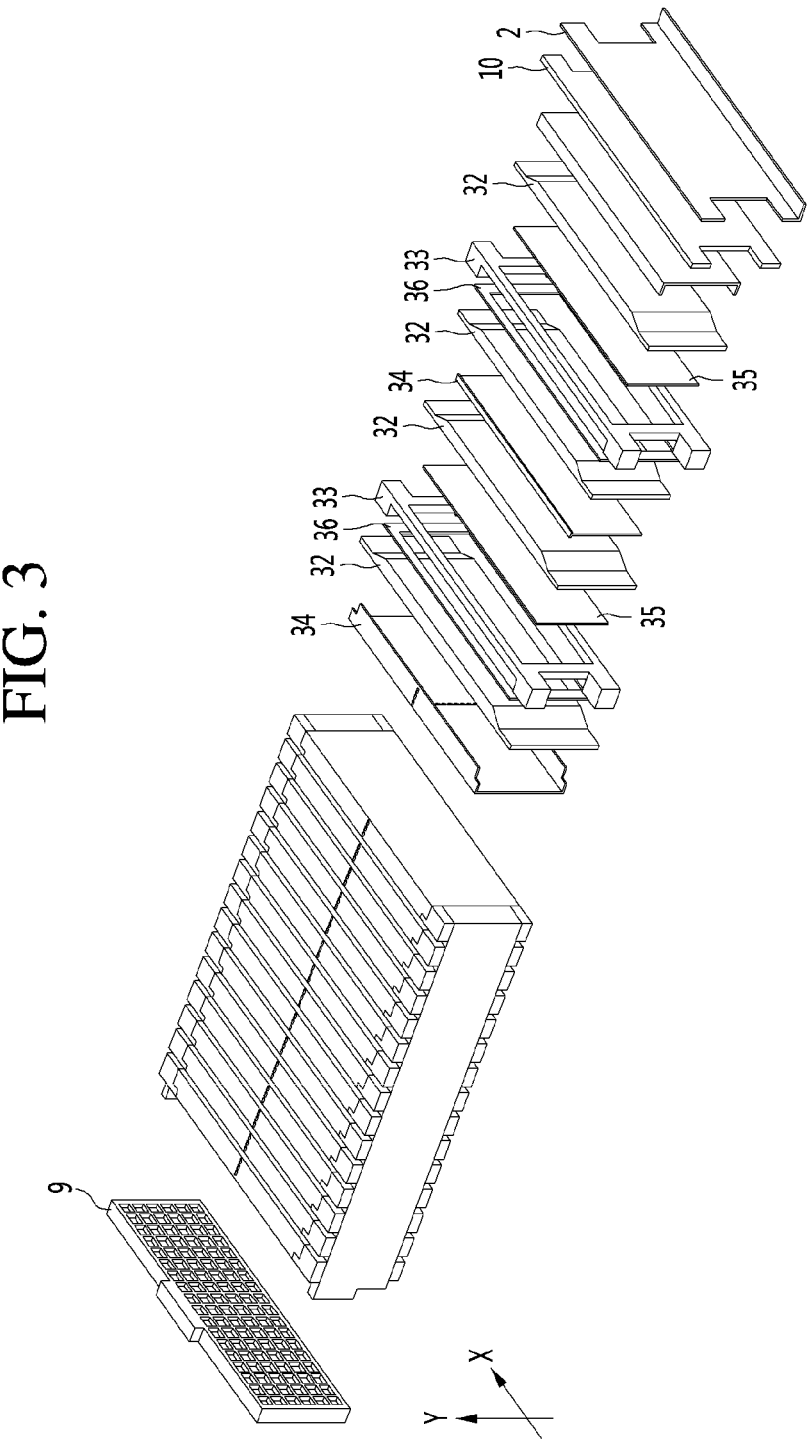
FIG. 3 is a diagram illustrating an example of an exploded perspective view of a battery pack according to some implementations.
Figure 4A:
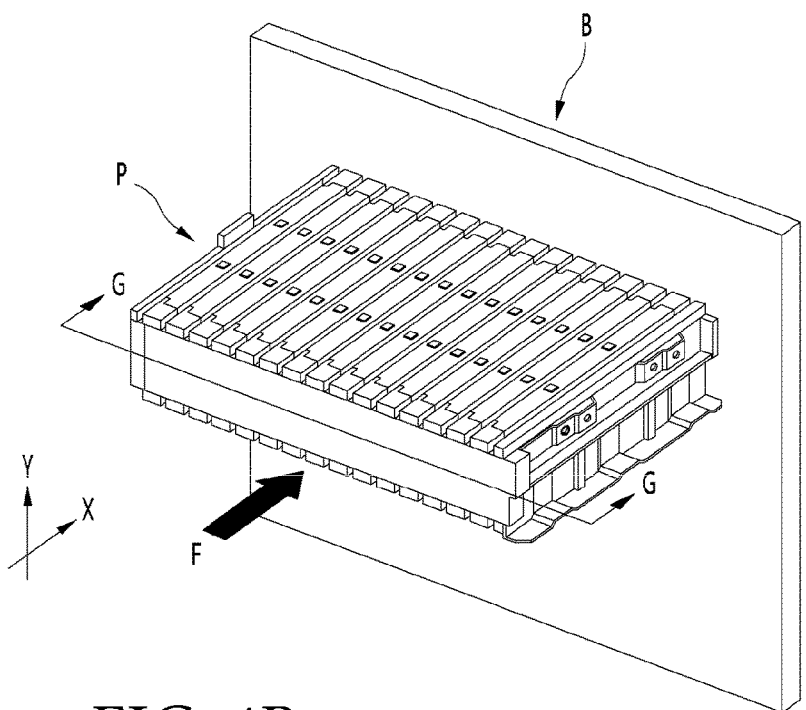
FIGS. 4A and 4B are diagrams illustrating examples of a perspective view of a scenario where an external impact is applied to the battery pack in FIG. 3.
Figure 4B:
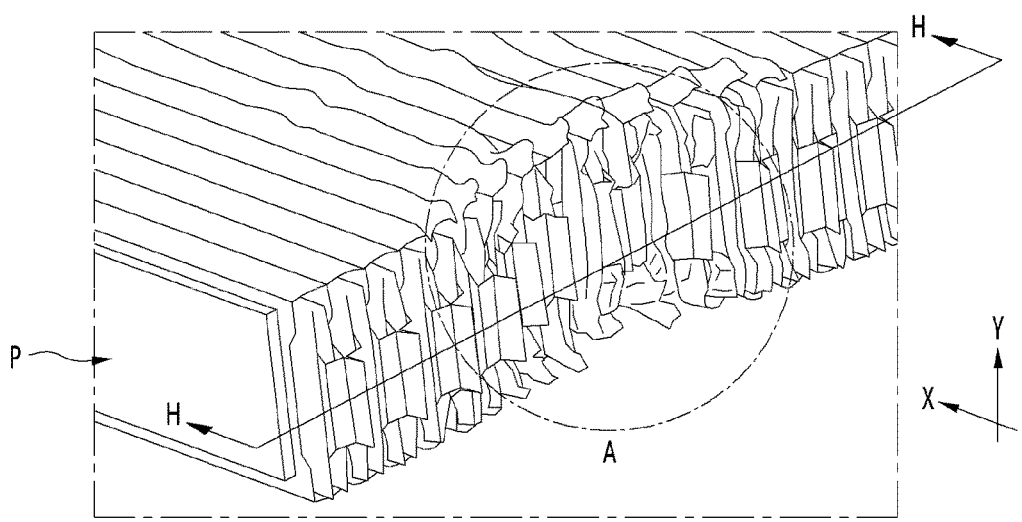
Figure 5A:
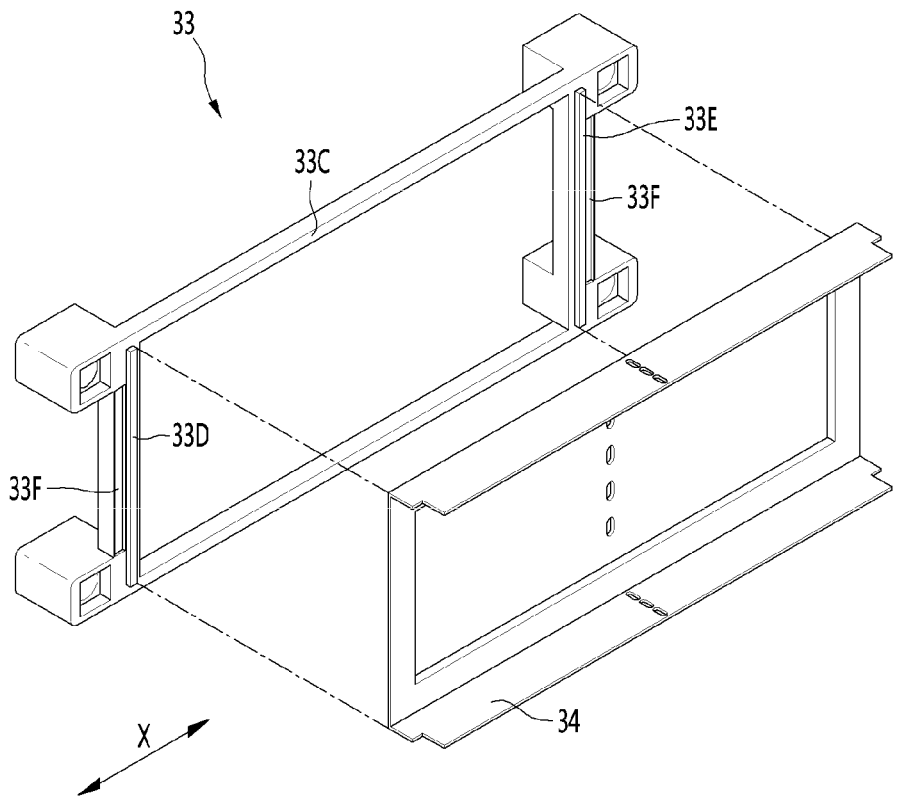
FIG. 5A is a diagram illustrating an example of a perspective view of a cartridge and a cooling cover in FIGS. 4A and 4B.
Figure 5B:
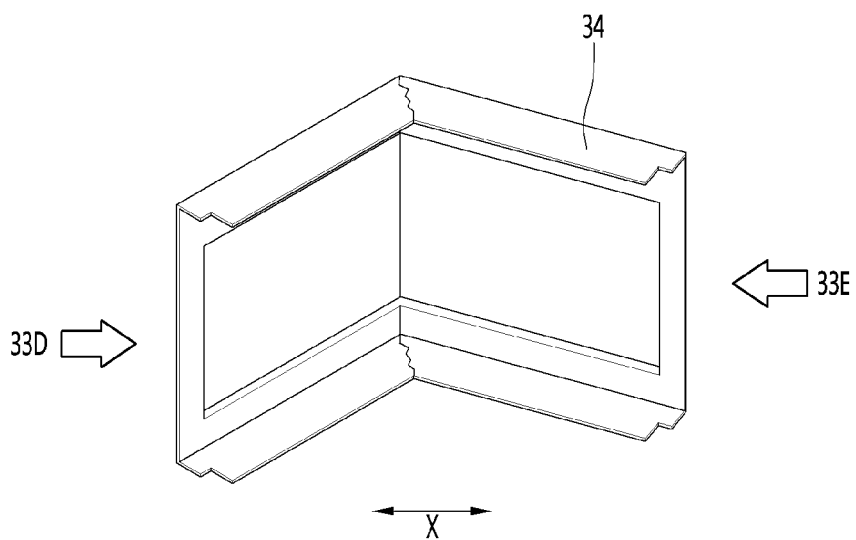
FIG. 5B is a diagram illustrating an example of a perspective view of a scenario where the cooling cover in FIG. 5A is bent.
Figure 6:
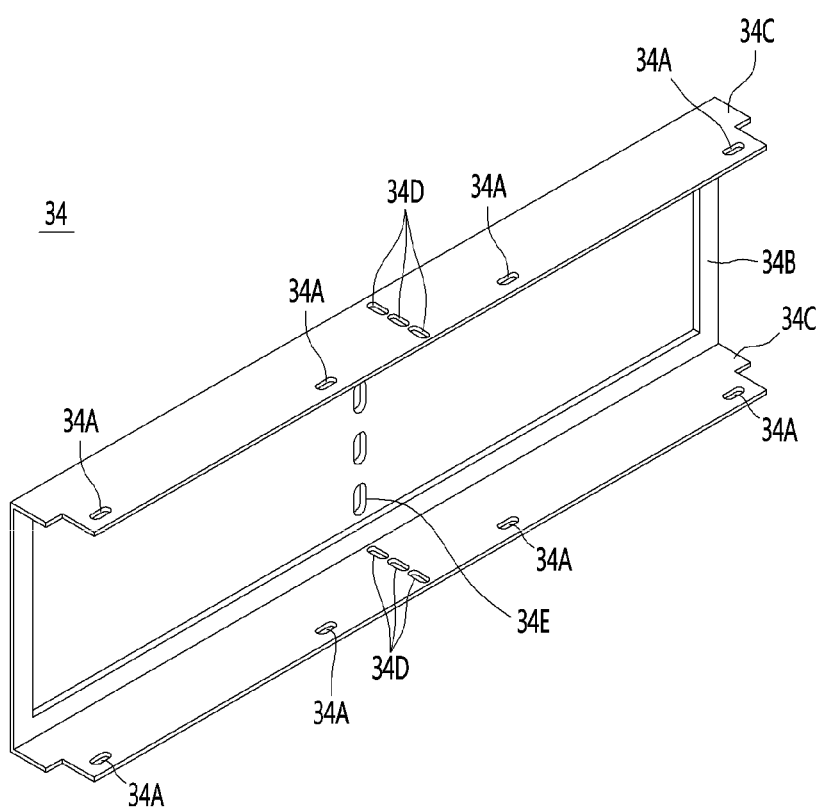
FIG. 6 is a diagram illustrating an example of a perspective view of the cooling cover according to some implementations.
Figure 7A:
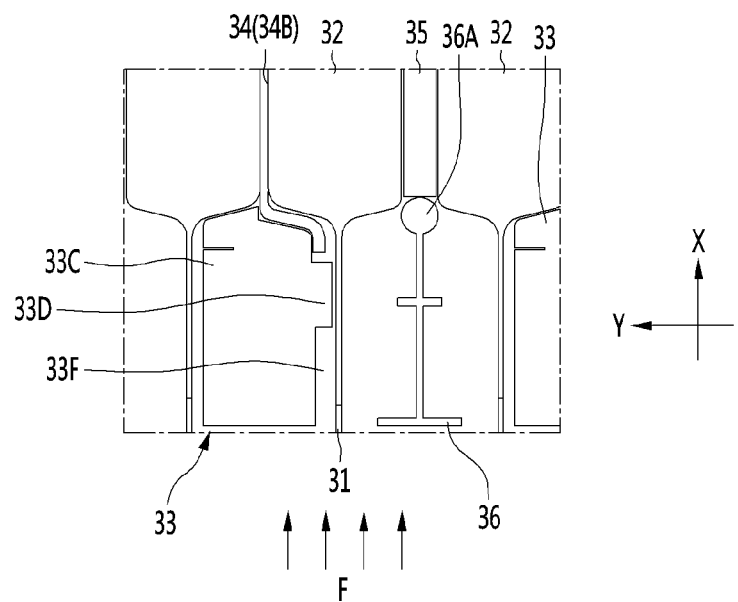
FIGS. 7A and 7B are diagrams illustrating examples of a cross-sectional view of a cross section of the battery pack in FIGS. 4A and 4B.
Figure 7B:
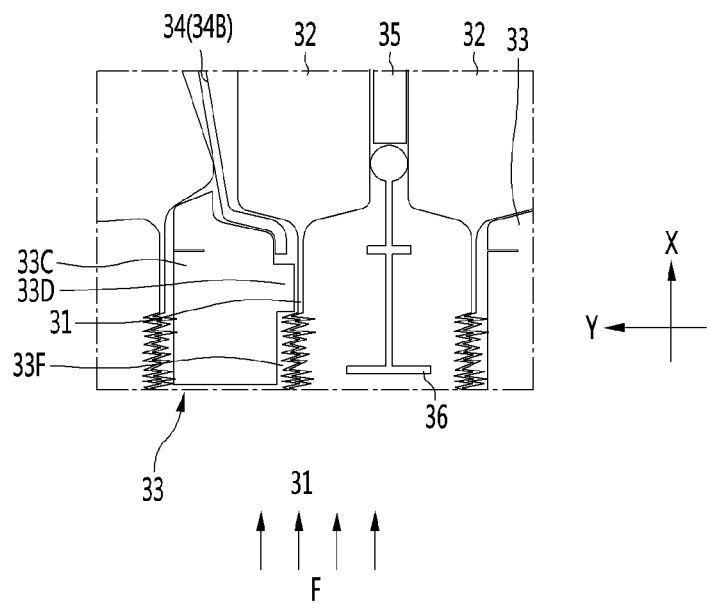

FIG. 3 is an exploded perspective view illustrating an example of a battery pack according to some implementations. FIGS. 4A and 4B illustrate examples of a scenario where an external impact is applied to the battery pack in FIG. 3. FIGS. 5A and 5B are perspective views illustrating examples of the cartridge and the cooling cover in FIGS. 4A and 4B. FIG. 6 is a perspective view illustrating an example of the cooling cover according to some implementations. FIGS. 7A and 7B illustrate examples of a cross section of the battery pack in FIGS. 4A and 4B. Further details will be described below with reference to the FIG. 3 to FIGS. 7A and 7B.

FIG. 3 illustrates a separator 9 and one of a number of groups of battery modules 3 that are divided by the separator 9. The plurality of battery modules 3 forming the group shown in FIG. 3 may be positioned between the separator 9 and the end plates 1 and 2.

As illustrated in FIG. 3, the stack may include the separator 9, the plurality of battery modules 3, the insulating sheet 10, and the end plates 1 and 2.

The battery module 3 may further include a secondary cartridge 36. Each battery module 3 may include a sequence including the cooling cover 34, the secondary cartridge 36, and the cartridge 33. The battery cell 32 and the buffering member 35 may be positioned in an order of the battery cell 32, the buffering member 35, and the battery cell 32 between the cooling cover 34 and the cartridge 33 of each battery module 3. The numbers of battery cells 32 or buffering members 35 which are included in each battery module 3 may be any suitable number, and are not limited to the example in FIG. 3.

In the stack of the battery module 3, one of the battery modules 3 is coupled with the separator 9 such that the heat conductive plate 34B of the battery module 3 faces the separator 9. The other battery modules 3 may be arranged so that their heat conductive plates 34B are coupled to a neighboring battery module 3, and in particular to be in contact with the cartridge 33 of the neighboring battery module 3. As such, the plurality of battery modules 3 may be stacked in a manner of coupling a sequence of battery modules 3 together.

FIG. 4A is a diagram illustrating an example of scenario where the battery pack P is impacted from the outside. The battery pack P may be mounted on an apparatus, for example on a structure B. If an outer force F is applied from the outside, the battery pack P receives the impact and as a result its shape may be deformed.

FIG. 4B is a diagram illustrating an example of a shape deformation after the battery pack P has received an impact. The area A may denote an area in which a shape deformation has occurred due to the outer impact.

When the shape of the battery pack P is deformed by an impact, one or more cell leads 31, such as a positive and negative pole cell leads 31, may be shifted or rearranged to come into contact with the cooling cover 34 as a result of the impact. If the cooling cover 34 is made of metal, e.g., to facilitate heat conduction, then contact between the cooling cover 34 and both the positive pole cell lead 31 and the negative pole cell lead 31 may form a closed circuit, resulting in a short-circuit. When contact between the cell leads 31 and the cooling cover 34 results in a short-circuit, the battery pack P may malfunction and cause a risk of sparks and fire.

Accordingly, to mitigate such risks, the battery pack P may implement a structure designed to prevent the cell leads 31 and the cooling cover 34 from coming into contact, despite any impacts.

In some implementations, the battery pack P may be configured such that, in scenarios where the battery pack P receives an impact from the outside, the cooling cover 34 bends in a manner that a distance between the cooling cover 34 and the cell leads 31 increases, rather than decreases. According to such implementations, because the distance between the cooling cover 34 and the cell leads 31 of the battery cell 32 is increased, this may help reduce the risk of a short-circuit between the cell leads 31 and the cooling cover 34.

FIG. 5A is a diagram illustrating an example of a cartridge 33 of a battery module 3. In this example, the cooling cover 34 of a neighboring battery module 3 is stacked onto the battery module 3.

The cartridge 33 may be configured to bend the cooling cover 34 in scenarios where the battery pack P receives an impact from the outside. In particular, in such scenarios, the cooling cover 34 may be bent by the cartridge 33 so that a distance between the cooling cover 34 and cell leads 31 of the battery cell 32 is increased, rather than decreased.

To achieve this, the cartridge 33 according to some implementations may be configured to bend the cooling cover 34 of a neighboring battery module 3, rather than bending the cooling cover 34 of the same battery module 3 that holds the cartridge 33 itself.

In particular, the example of FIG. 5A illustrates a coupling state between the cartridge 33 of the battery module 3 and the cooling cover 34 of a neighboring other battery module 3 which is adjacent to the battery stack module 3.

In this example, the cartridge 33 of battery module 3 may include a seating portion 33C in which a battery cell 32 (e.g., shown in FIG. 3) is seated. On the seating portion 33C are provided a pressing portion 33D and a supporting portion 33E.

In some implementations, the pressing portion 33D and the supporting portion 33E may be provided in one surface of the seating portion 33C that is opposite a surface on which a battery cell 32 is seated. For example, a battery cell 32 may be mounted to contact one surface of the seated portion 33C, and the pressing portion 33D and supporting portion 33E may be formed on the other surface of the seated portion 33C.

The pressing portion 33D and the supporting portion 33E may be spaced apart from each other, e.g., by a constant distance. In some implementations, the pressing portion 33D and the supporting portion 33E may be projected to face each other.

The pressing portion 33D and supporting portion 33E may each include a plurality of projecting portions formed on the seating portion 33C, as shown in FIG. 5A. For example, the plurality of projecting portions may be directed in a direction toward the cartridge 33 and the other neighboring battery modules 3. In some implementations, the pressing portion 33D and supporting portion 33E may each be formed elongated in a perpendicular direction to a longitudinal direction of the cartridge 33.

The pressing portion 33D and supporting portion 33E may each have a rib shape. In some implementations, the rip shape may include a plurality of rib shapes.

In some implementations, the pressing portion 33D and the supporting portion 33E may have similar shapes as each other, although implementations are not limited thereto. In general, the pressing portion 33D and the supporting portion 33E may be differently shaped or sized from each other while satisfying the description above.

The pressing portion 33D of the battery module 3 may be in contact with a first end of the cooling cover 34 of a neighboring battery module 3.

The supporting portion 33E of the battery module 3 may be in contact with the second end of the cooling cover 34 of the neighboring battery module 3.

A height to which the pressing portion 33D of the battery module 3 projects from the cartridge 33 may be similar (e.g., equal) to a thickness of the cooling cover 34, or may be greater than a thickness of the cooling cover 34.

Analogously, a height to which the supporting portion 33E of the battery module 3 projects from the cartridge 33 may be similar (e.g., equal) to the thickness of the cooling cover 34, or may be greater than the thickness of the cooling cover 34.

The cooling cover 34 of the neighboring battery module 3 may be positioned between the pressing portion 33D and the supporting portion 33E of the battery module 3.

A gap by which pressing portion 33D and supporting portion 33E are spaced apart from each other may correspond to a length of the heat conductive plate 34B of the cooling cover 34 included in the neighboring battery module 3.

As a result, the cooling cover 34 of the neighboring battery module 3 may be restricted from movement in a longitudinal direction of the cooling cover 34 due to the pressing portion 33D.

Analogously, the cooling cover 34 of the battery module 3 and the neighboring battery modules 3 may be restricted in the longitudinal direction of the cooling cover 34 due to the supporting portion 33E of the battery module 3.

FIG. 5B is a diagram illustrating an example of a scenario in which the cooling cover 34 of the neighboring battery module 3 receives pressure from the cartridge 33 of the battery module 3, and is thus bent.

In a case where an impact is applied to the battery pack P from the outside, the pressing portion 33D of the battery module 3 may press one end or one side of the cooling cover 34 of the neighboring battery module 3. The cooling cover 34 of the neighboring battery module 3 receives pressure from the pressing portion 33D and may bend as illustrated in FIG. 5B.

In addition, where an impact is applied to the battery pack P from the outside, the pressing portion 33D of the battery module 3 may press one end or one side of the cooling cover 34 of the neighboring battery module 3 of the battery module 3. The supporting portion 33E of the battery module 3 may support the other end or the other side of the cooling cover 34 of the neighboring battery module 3.

The one end or one side of the cooling cover 34 may correspond to one end or one side of the heat conductive plate 34B. The other end or other side of the cooling cover 34 may correspond to the other end or other side of the heat conductive plate 34B.

The one end of the cooling cover 34 may be perpendicular to the longitudinal direction of the cooling cover 34. The other end of the cooling cover 34 may be perpendicular to the longitudinal direction of the cooling cover 34.

The one end or the one side of the heat conductive plate 34B of the cooling cover 34 may be perpendicular to the longitudinal direction of the cooling cover 34. The other end or the other side of the heat conductive plate 34B of the cooling cover 34 is perpendicular to the longitudinal direction of the cooling cover 34.

The cooling cover 34 of the other battery module 3 receives pressure from the pressing portion 33D of battery module 3 and may be supported from the supporting portion 33E. The pressure in the transverse direction may act to the cooling cover 34. The cooling cover 34 received the pressure in the transverse direction may be bent as illustrated in FIG. 5B.

In a case where the cooling cover 34 is bent as illustrated in the FIG. 5B, the gap between the one end and the other end of the cooling cover 34 may be decreased than that of before the cooling cover 34 is bent.

In a case where the cooling cover 34 is bent as illustrated in the FIG. 5B, the gap between the one side and the other side of the cooling cover 34 may be decreased than that of before the cooling cover 34 is bent.

In a case where the cooling cover 34 is bent as illustrated in the FIG. 5B, the gap between the one end and the other end of the cooling cover 34 may be decreased than the length of the battery cell 32.

In a case where the cooling cover 34 is bent as illustrated in the FIG. 5B, the gap between the one side and the other side of the cooling cover 34 may be more decreased than the length of the battery cell 32.

In a case where the cooling cover 34 is bent as illustrated in the FIG. 5B, a bending line perpendicular to the longitudinal direction of the cooling cover 34 may be formed in the heat conductive plate 34B of the cooling cover 34.

In a case where the cooling cover 34 is bent as illustrated in the FIG. 5B, a bending line perpendicular to the longitudinal direction of the cooling cover 34 may be formed in the fastening plate 34C of the cooling cover 34.

With reference to FIG. 6, the cooling cover 34 according to some implementations may further include a hole except for the projection coupling hole 34A of the projection 36A for coupling with the cartridge 33.

In a case where the battery pack P receives an impact, the cooling cover 34 includes the hole and thus may be more easily bent.

The hole may have a long hole shape. The cooling cover 34 may include a plurality of holes.

The heat conductive plate 34B may include a hole 34E. The hole 34E which is formed on the heat conductive plate 34B is formed to be lengthened and thus may have a long hole shape.

The hole 34E formed on the heat conductive plate 34B is a long hole shape and may be positioned to be perpendicular to the longitudinal direction of the heat conductive plate 34B. The hole 34E formed on the heat conductive plate 34B is a long hole shape and may be positioned to be perpendicular to the longitudinal direction of the cartridge 33.

The hole 34E formed on the heat conductive plate 34B may be lengthened to be vertical to the longitudinal direction of the cooling cover 34. The hole 34E formed on the heat conductive plate 34B may be lengthened to be vertical to the longitudinal direction of the heat conductive plate 34B.

The heat conductive plate 34B may include a plurality of holes 34E. In a case where the heat conductive plate 34B includes a plurality of holes 34E, the plurality of holes 34E may position in a state of forming a row. The plurality of holes 34E are spaced apart in the perpendicular direction to the longitudinal direction of the heat conductive plate 34B. The plurality of the holes 34E are spaced apart in the perpendicular direction to the longitudinal direction of the heat conductive plate 34B. The heat conductive plate 34B may be symmetrical with respect to a row formed by a plurality of holes 34E.

The heat conductive plate 34B may be symmetrical with respect to a row formed by a plurality of holes 34E. The cooling cover 34 may be symmetrical with respect to a row formed by a plurality of holes 34E.

The cooling cover 34 may include the pair of the fastening plates 34C. A hole 34D may be formed on any fastening plate 34C of the pair of fastening plates 34C. The hole 34D formed on the pair of fastening plates 34C may be symmetrical with each other.

The hole 34D which is formed on the fastening plate 34C is formed to be lengthened and thus may have a long hole shape.

The hole 34D formed on the fastening plate 34C is a long hole shape and may be positioned to be perpendicular to the longitudinal direction of the fastening plate 34C. The hole 34D formed on the fastening plate 34C is a long hole shape and may be positioned to be perpendicular to the longitudinal direction of the cartridge 33.

The hole 34D formed on the fastening plate 34C may be lengthened to be vertical to the longitudinal direction of the cooling cover 34. The hole 34D formed on the fastening plate 34C may be lengthened to be vertical to the longitudinal direction of the fastening plate 34C.

The fastening plate 34C may include a plurality of holes 34D. In a case where the fastening plate 34C may include a plurality of holes 34D, the plurality of holes 34D may be positioned in a state of forming a row. The plurality of holes 34D may be spaced apart in the perpendicular direction to the longitudinal direction of the fastening plate 34C. The plurality of holes 34D are spaced apart in the perpendicular direction to the longitudinal direction of the cooling cover 34. The fastening plate 34C may be symmetrical with respect to a row formed by a plurality of holes 34D.

FIG. 7A is a cross-sectional view illustrating a cross section of the battery pack P in FIGS. 4A and 4B. FIG. 7A is a cross-sectional view of the G-G line and illustrates a state before the battery pack P receives the impact. FIG. 7B is a cross-sectional view of the H-H line and illustrates a state after the battery pack P receives the impact.

When the external force is applied to the battery pack P in the X direction, the shape deformation as illustrated in FIG. 7B may occur in the battery pack P.

When the external force is applied to the battery pack P in the X direction, the pressing portion 33D of the cartridge 33 presses one end or one side of the cooling cover 34 in the X direction. At this time, the support portion 33E of the cartridge 33 may support one end or one side of the cooling cover 34 in the X direction.

When the external force is applied to the battery pack P in the X direction, the cooling cover 34 may be bent as illustrated in FIG. 7B due to the pressing portion 33D of the cartridge 33.

When the external force is applied to the battery pack P in the X direction, the cooling cover 34 may be bent as illustrated in FIG. 7B due to the pressing portion 33D and the supporting portion 33E of the cartridge 33.

When the cooling cover 34 is bent as illustrated in FIG. 7B, the cooling cover 34 and the cell lead 31 is not in contact with each other to be space apart from each other. In other words, even if the battery pack P receives an impact from the outside, the cooling cover 34 and cell lead 31 is not short-circuited and thus the danger of overheat or fire may be reduced.

When the external force is applied to the battery pack P in the X direction, the cell lead 31 of the battery cell 32 receives the pressure in the X direction. When the cell lead 31 receives the pressure in the X direction, the cell lead 31 may be crumpled as illustrated in FIG. 7B.

As illustrated in FIG. 7B, the cell lead 31 receives the external force and thus may be crumpled. When the crumpled cell lead 31 does not have a sufficient space to escape, the cell lead 31 may be lost. In a case where the cell lead 31 is lost, the length of the cell lead 31 may be decreased and there is a danger that the cooling cover 34 and the battery is short-circuited.

Accordingly, some implementations are provided so that the space in which the crumpled cell lead 31 is to be escaped so that the cell lead 31 is not lost due to the external force. Therefore, the cartridge 33 according to some implementations may include a stepped portion 33F.

The stepped portion 33F may provide the space in which the crumpled cell lead 31 escapes in a case where an external force is applied to the battery pack P.

Accordingly, the cell lead 31 may move in the stacking direction of the battery cell 32 due to the space in which the stepped portion 33F provides. The cell lead 31 may move in the perpendicular direction to the stacking direction of the battery cell 32 due to the space in which the stepped portion 33F is provided.

Alternatively, the cell lead 31 may move in the stacking direction of the battery module 3 due to the space in which the stepped portion 33F may be provided. The cell lead 31 may move in the perpendicular direction to the stacking direction of the battery module 3 due to the space in which the stepped portion 33F provided.

The cartridge 33 of the battery module 3 may include a seating portion 33C in which the battery cell 32 is seated. A stepped portion 33F is provided in one surface of the seating portion 33C.

The battery cell 32 may be seated to be contacted on the one surface of the seated portion 33C. The stepped portion 33F may be formed on the other surface of the seated portion 33C.

The stepped portion 33F may be formed in parallel with the pressing portion 33D.

The stepped portion 33F may be formed in parallel with the supporting portion 33E.

The stepped portion 33F may be formed to face at least a portion of the cell lead 31.

The stepped portion 33F included in the cartridge 33 of the battery module 3 may be formed to be parallel with the cooling cover 34 of the other neighboring battery module 3 to the battery module 3.

The stepped portion 33F included in the cartridge 33 of the battery module 3 may be formed to be parallel with the heat conductive plate 34B of the other neighboring battery module 3 of the battery module 3.

The step of the stepped portion 33F is formed to be smaller than the thickness of the cartridge 33.

The step of the stepped portion 33F is formed to be smaller than the thickness of the seating portion 33C of the cartridge 33.

The stepped portion 33F may be formed on the same surface with one surface of the seating portion 33C on which the pressing portion 33D is formed. The stepped portion 33F may be formed in the outer side of the pressing portion 33D.

The stepped portion 33F may be formed on the same surface with one surface of the seating portion 33C on which the supporting portion 33E is formed. The stepped portion 33F may be formed in the outside of the supporting portion 33E.

The stepped portion 33F is formed to be lengthened in the perpendicular direction to the longitudinal direction of the cartridge 33.

The width of the stepped portion 33F may be equal to the width of the cell lead 31.

The width of the stepped portion 33F may be greater than the width of the cell lead 31.

The gap between the stepped portion 33F formed on the outside of the pressing portion 33D and the stepped portion 33F formed on the outside of the supporting portion 33E may be greater than the gap between the pressing portion 33D and the supporting portion 33E.

The gap between the stepped portion 33F formed on the outside of the pressing portion 33D and the stepped portion 33F formed on the outside of the supporting portion 33E may be greater than the length of the cooling cover 34.

The battery module 3 may further include a secondary cartridge 36. Each of the battery module 3 may position in an order of the cooling cover 34, the secondary cartridge 36 and the cartridge 33. The battery cell 32 and the buffering member 35 may position in an order of the battery cell 32, the buffering member 35 and the battery cell 32 between the cooling cover 34 and the cartridge 33 of the each battery module 3.

The secondary cartridge 36 may position in parallel with the cartridge 33.

The secondary cartridge 36 may position in parallel with the cooling cover 34.

The secondary cartridge 36 may position toward one end or one side of the buffering member 35 positioned between the battery cell 32 and the battery cell 32, as illustrated in FIG. 7A.

The secondary cartridge 36 may further include a projection 36A toward one end or one side of the buffering member 35 positioned between the battery cell 32 and the battery cell 32, as illustrated in FIG. 7A.

When the buffering member 35 is not provided between the battery cell 32 and the battery cell 32, the battery cell 32 and the battery cell 32 may surface-contact. In this case, the secondary cartridge 36 may position toward the contact surface between the battery cell 32 and the battery cell 32. Alternatively, the secondary cartridge 36 may further include a projection 36A toward the contact portion between the battery cell 32 and the battery cell 32.

When the external force is applied to the battery pack P in the X direction, the shape deformation as illustrated in FIG. 7B may occur in the battery pack P.

When the external force is applied to the battery pack P in the X direction, the pressing portion 33D of the cartridge 33 presses one end or one side of the cooling cover 34 in the X direction. At this time, the secondary cartridge 36 may enter toward the buffering member 35. When the secondary cartridge 36 may enter toward the buffering member 35, the projection 36A of the secondary cartridge 36 may position between the battery cell 32 and the battery cell 32 as illustrated in the FIG. 7B.

The buffering member 35 is not provided between the battery cell 32 and the battery cell 32 and the battery cell 32 and the battery cell 32 may surface-contact. At this time, when an external force is applied to the battery pack P in the X direction, the secondary cartridge 36 may enter toward the contact surface between the battery cell 32 and the battery cell 32. At this time, When the secondary cartridge 36 may enter toward the contact surface between the battery cell 32 and the battery cell 32, the projection 36A of the secondary cartridge 36 may position between the battery cell 32 and the battery cell 32.

The projection 36A of the secondary cartridge 36 may position between the battery cell 32 and the battery cell 32. When an external force is applied to the battery pack P in the X direction, the projection 36A of the secondary cartridge 36 may press the battery cell 32 contacting the projection 36A.

With reference to FIG. 7B, the projection 36A of the secondary cartridge 36 may press the two battery cell 32 contacting the projection 36A in the mutually opposite directions according to Y direction. The secondary cartridge 36 may press the two battery cell 32 according to the Y direction and thus the cooling cover 34 and the cartridge 33 may contact without misaligning to each other, even if the external force is applied to the battery pack P. Accordingly, the cooling cover 34 may be more easily bent by the secondary cartridge 36.

Figure 8:
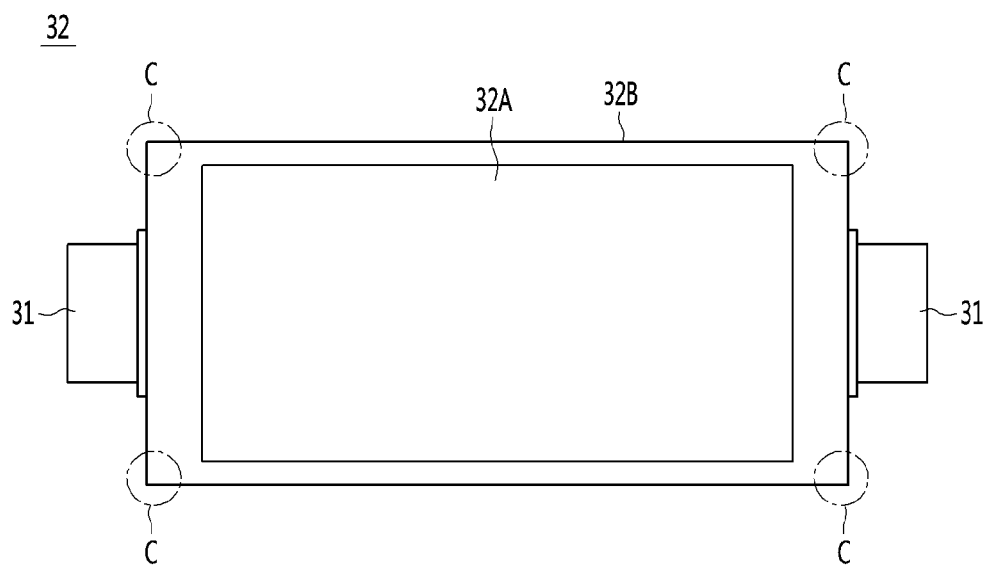
FIG. 8 is a diagram illustrating an example of a front view of a battery cell according to an implementation.
Figure 9:
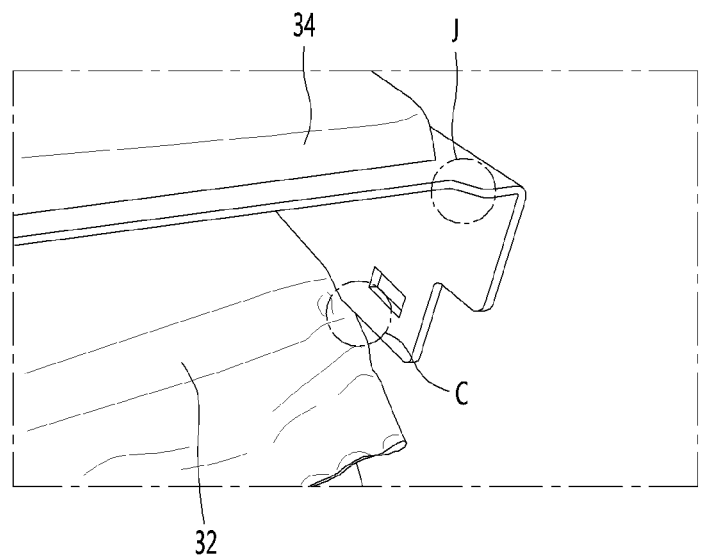
FIG. 9 is a diagram illustrating an example of an enlarged view of the cooling cover and the battery cell contacting the cooling cover.
Figure 10A:
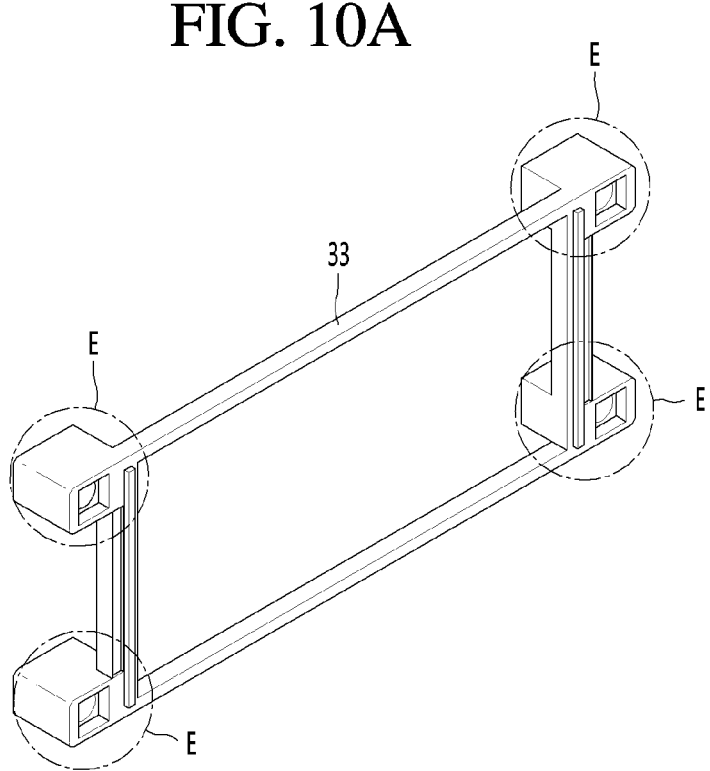
FIG. 10A is a diagram illustrating an example of a perspective view of the cartridge according to an implementation.
Figure 11A:
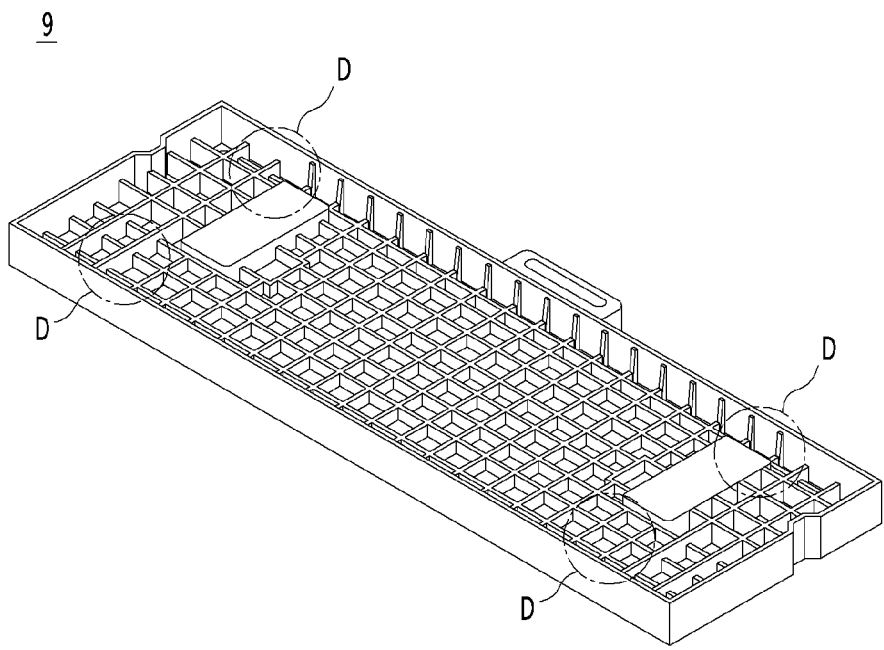
FIG. 11A is a diagram illustrating an example of a perspective view of a separator according to an implementation.
Figure 12A:
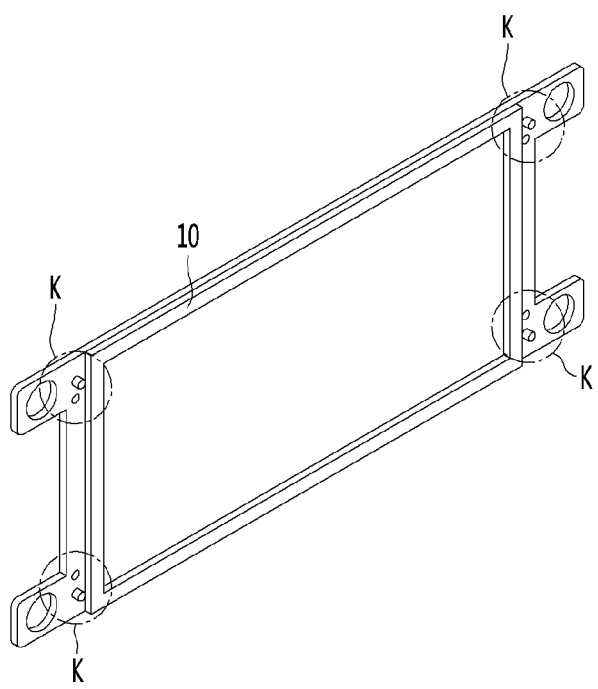
FIG. 12A is a diagram illustrating an example of a perspective view of an insulating sheet according to an implementation.

FIG. 8 is a front view illustrating a battery cell according to an implementation, FIG. 9 is an enlarged view illustrating the cooling cover and the battery cell contacting the cooling cover, FIG. 10A is a perspective view illustrating a cartridge according to an implementation, FIG. 11A is a perspective view illustrating a separator according to an implementation, and FIG. 12A is a perspective view illustrating an insulating sheet according to an implementation.

The battery cell 32 may include a battery cell main body 32A in which a charge is stored, a cell lead 31 which is connected to the battery cell main body 32A, and an exterior material 32B. The exterior material 32B performs a role that insulates the battery cell main body 32A. The exterior material 32B may surround the battery cell main body 32A and may surround at least a portion of the cell lead 31.

With reference to the FIG. 8, a C area in which the exterior material 32B overlaps with the edge of the battery cell 32 may be formed. In a case where the battery cell 32 has a rectangular shape, the C area may be formed on the four portions. The C area may be a corner portion or an edge portion of an outer appearance of the battery cell 32.

The cooling cover 34 may generate a sharp corner due to the production process. With reference to FIG. 9, the sharp corner may be a J area. The cooling cover 34 and the battery cell 32 may be in surface-contact with each other. Further, the battery pack P may be mounted on the entire structure as a portion of the entire structure, and thus the battery pact P receives vibration and impact. At this time, the C area of the battery cell 32 which is in surface-contact with the cooling cover 34 makes friction with the J area of the cooling cover 34. Alternatively, the C area of the battery cell 32 which is in surface-contact with the cooling cover 34 makes repeatedly friction and separation with the J area of the cooling cover 34.

Thus, the C region of the battery cell 32 may be damaged or torn. When C region of the battery cell 32 is damaged or torn, the battery cell main body 32A is not insulated. In this case, the insulation of the battery cell 32, the battery module 3 or the battery pack P may be destroyed. Accordingly, a structure which allows the C area of the battery cell 32 and the J area of the cooling cover 34 to be appropriately separated or spaced apart from each other is needed.

FIG. 10A is a perspective view illustrating a cartridge 33 according to an implementation, The cartridge 33 of the battery module 3 may include a seating portion 33C in which the battery cell 32 is seated. A projection portion 33G may be provided in one surface of the seating portion 33C.

The projection portion 33G may be formed on one surface of the seating portion 33C on which the pressing portion 33D is formed. The projection portion 33G may be formed on one surface of the seating portion 33C on which the supporting portion 33E is formed.

The battery cell 32 may be seated to be contacted on the one surface of the seated portion 33C. The projection portion 33G may be formed on the other surface of the seated portion 33C.

With reference to the FIG. 10A, an E area may be formed on the edge of the cartridge 33 or the seating portion 33C. In a case where the seating portion 33C or cartridge 33 has a square shape, the E area may be formed on the four portions. The E area may be the edge portion or the corner portion of a seating portion 33C or the cartridge 33. The projection portion 33G may be formed on the E area. A plurality of projection portions 33G may be formed.

The projection portion 33G formed on the E area of the seating portion 33C or the cartridge 33 allows the C area of the battery cell 32 which is in surface-contact with the cooling cover 34 of the other neighboring battery module 3 to be bent or folded.

When the C area of the battery cell 32 which is in surface-contact with the cooling cover 34 is bent or fold, the C area may be separated or spaced apart from the J area of the cooling cover 34 and thus the risk that the outer appearance of the battery cell 32 is damaged may be reduced.

Figure 10B:
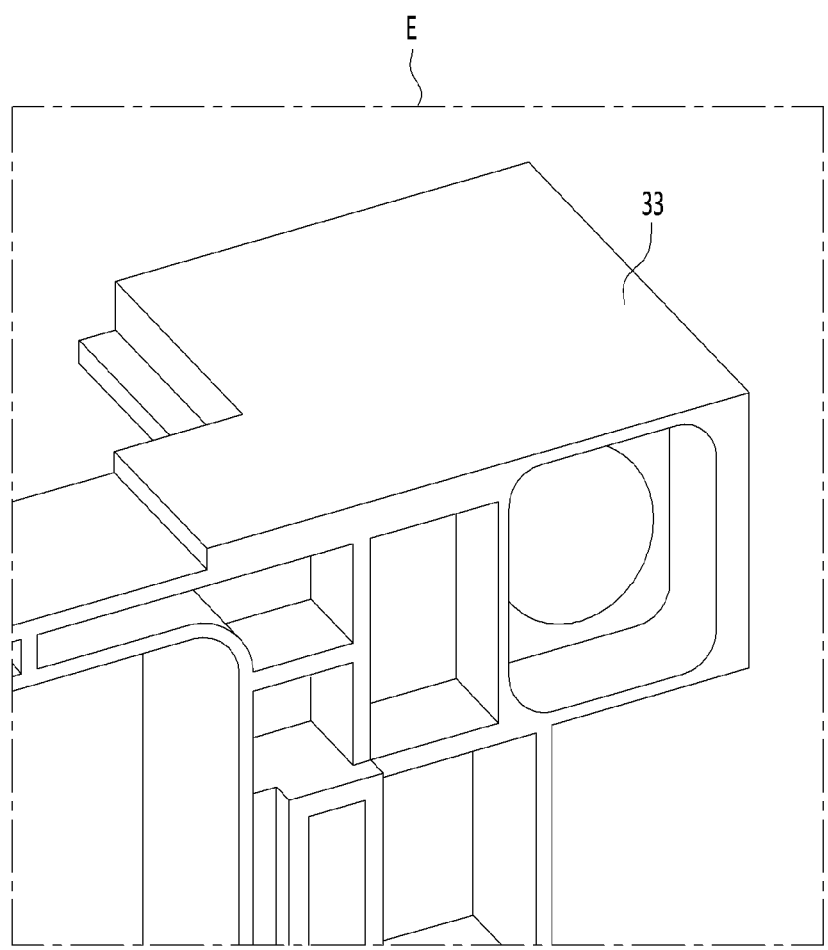
FIG. 10B is a diagram illustrating an example of an enlarged view of one possible configuration for the area denoted "E" in FIG. 10A.
Figure 10C:
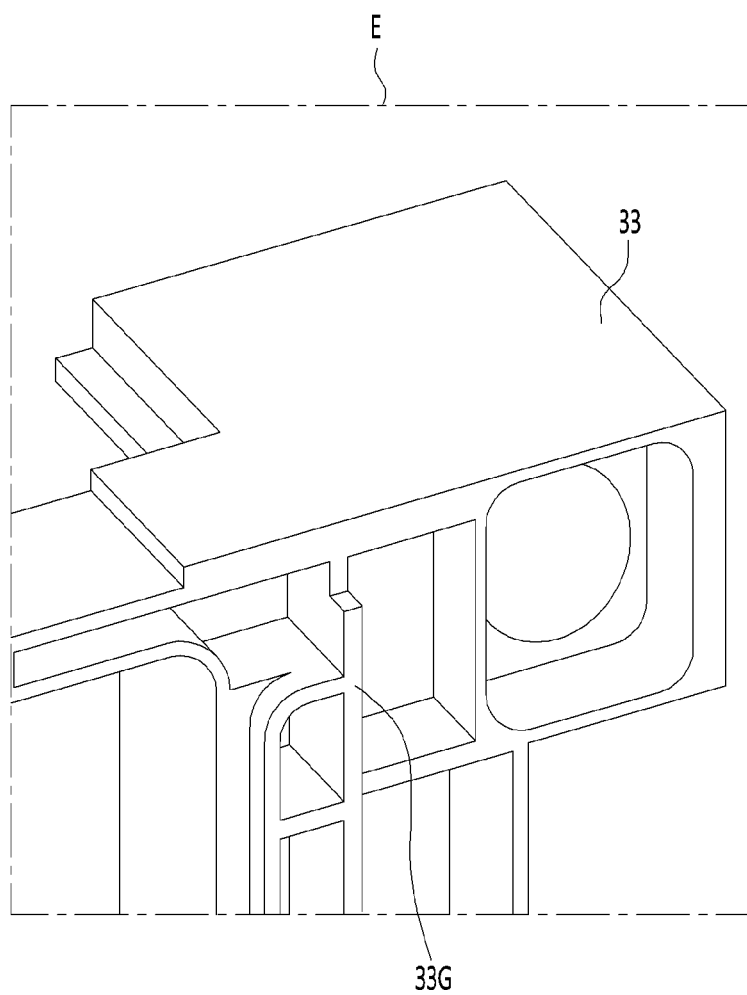
FIG. 10C is an enlarged view illustrating an implementation according to the present disclosure of the area denoted "E" in FIG. 10A.

FIG. 10B illustrates an example of a configuration in which the cartridge 33 without a projection portion (e.g., without a projection portion 33G of FIG. 10C). By contrast, according to implementations disclosed herein, the cartridge 33 may implement a projection portion 33G that is projected as described below.

FIG. 10C illustrates an implementation in which a projection portion 33G is formed. The projection portion 33G may have a rib shape.

FIG. 11A is a perspective view illustrating a separator 9 according to an implementation, The separator 9 may be in surface-contact with the cooling cover 34. The separator 9 may be in surface-contact with a pair of cooling covers 34 with the separator 9 being disposed between the cooling covers 34.

The separator 9 may be in surface-contact with the heat conductive plate 34B of the cooling cover 34. The separator 9 may be in surface-contact with a pair of heat conductive plates 34B with the separator 9 being disposed between the heat conductive plates 34B.

The projection portion 3G may be formed on one surface of the separator 9. Further, the projection portion 3G may be formed on the other surface of the separator 9.

A D area may be formed on the edge of the separator 9, with reference to FIG. 11A. In a case where the separator 9 has a square shape, the D area may be formed on the four portions. The D area may be a corner portion or an edge portion of the separator 9. The projection portion 9A may be formed on the D area. A plurality of projection portions 9A may be formed. Further, the projection portion 9A may be formed on the opposite surface of the D area.

The projection portion 9A formed on the D area of the separator 9 allows the C area of the battery cell 32 which is in surface-contact with the cooling cover 34 of the neighboring battery module 3 of the separator 9 to be bent or folded.

When the C area of the battery cell 32 which is in surface-contact with the cooling cover 34 is bent or fold, the C area may be separated or spaced apart from the J area of the cooling cover 34 and thus the risk that the outer appearance of the battery cell 32 is damaged may be reduced.

Figure 11B:
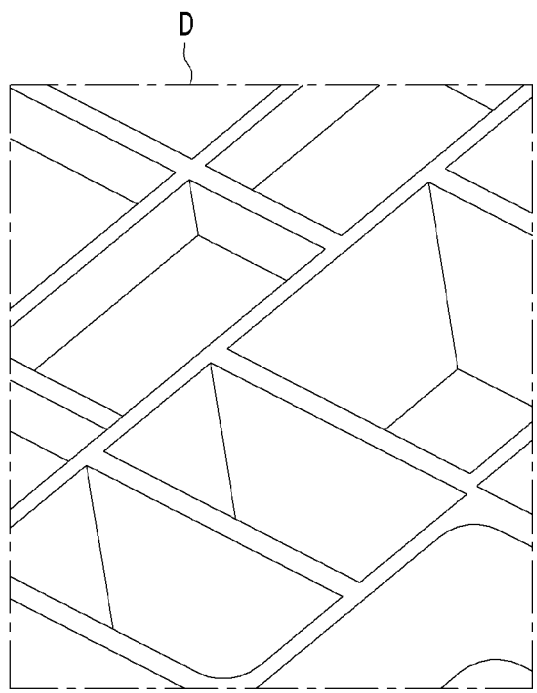
FIG. 11B is a diagram illustrating an example of an enlarged view of one possible configuration for the area denoted "D" in FIG. 11A.
Figure 11C:
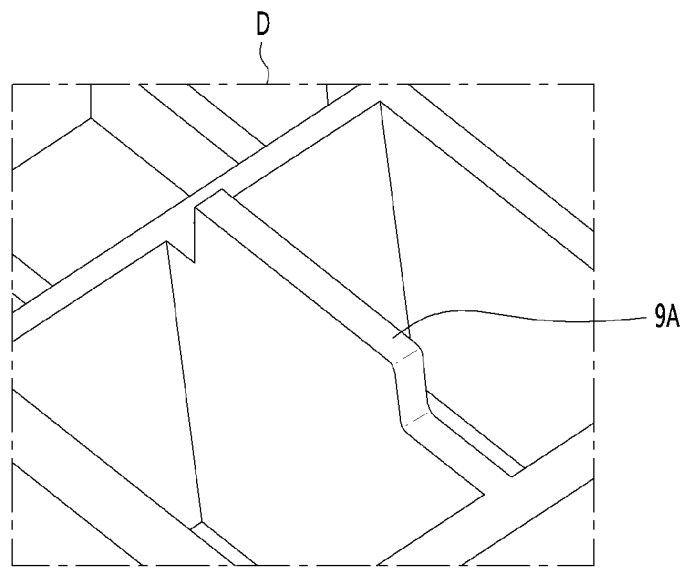
FIG. 11C is a diagram illustrating an example of an enlarged view of an implementation according to the present disclosure of the area denoted "D" in FIG. 11A.

FIG. 11B illustrates an example of a separator 9 that does not implement a projection portion (e.g., that does not implement the projection portion 9A of FIG. 11C). By contrast, FIGS. 11C to 11E illustrate implementations according to the present disclosure in which a projection portion 9A is formed.

Figure 11D:
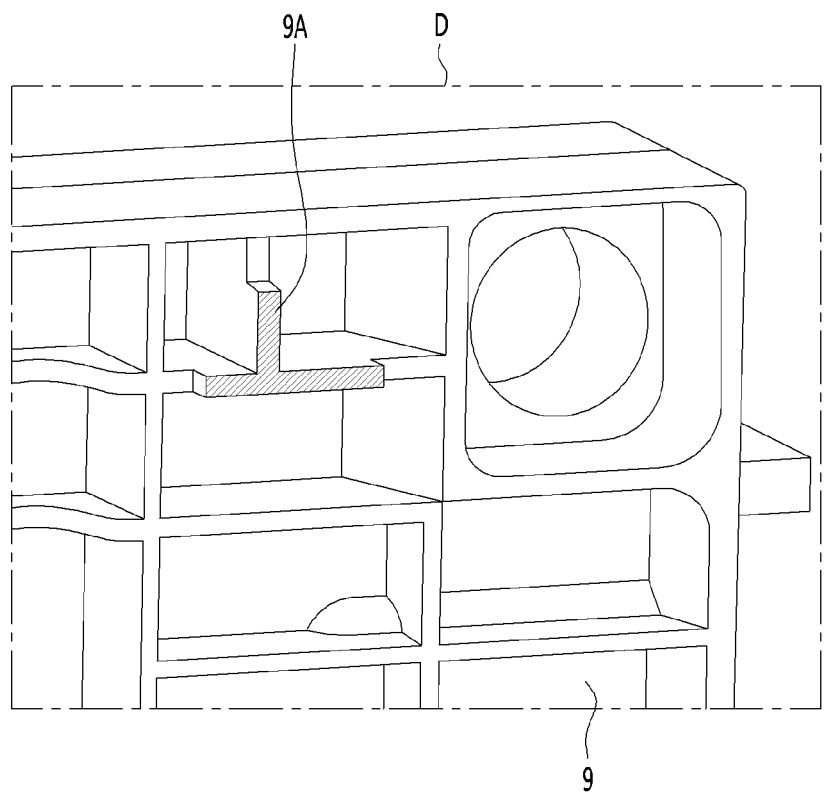
FIG. 11D is a diagram illustrating an example of an enlarged view of another implementation according to the present disclosure of the area denoted "D" in FIG. 11A.
Figure 11E:
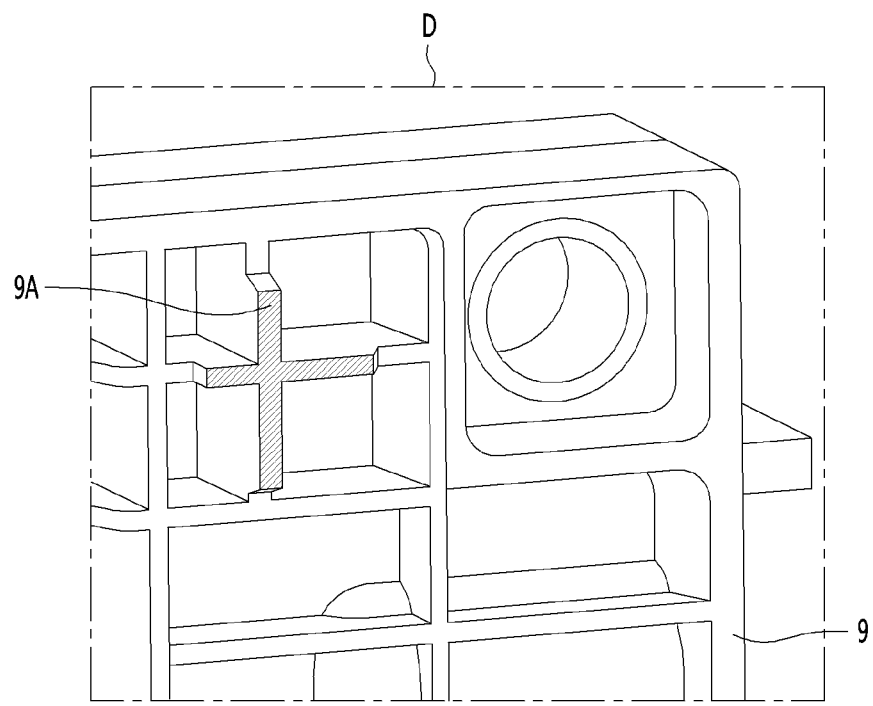
FIG. 11E is a diagram illustrating an example of an enlarged view of another implementation according to the present disclosure of the area denoted "D" in FIG. 11A.

The projection portion 9A may be formed as shown in FIGS. 11C to 11E. However, the separator 9 according to some implementations may be formed the projection portion 9A which is parallel in the longitudinal direction of the separator 9 as illustrated in FIG. 11C. The projection portion 9A may have a rib shape.

Further, the cartridge 33 according to some implementations may be formed the projection portion 9A which is parallel in the longitudinal direction of the separator 9 and the projection portion 9A which is perpendicular to the longitudinal direction of the separator 9 as illustrated in FIG. 11D. The projection portion 9A may have a rib shape.

Further, the cartridge 33 according to some implementations may be formed the projection portion 9A which is parallel in the longitudinal direction of the separator 9 and the projection portion 9A which is perpendicular to the longitudinal direction of the separator 9 as illustrated in FIG. 11E. Further, the projection portion 9A parallel with the longitudinal direction of the separator 9 and the projection portion 9A perpendicular to the longitudinal direction of the separator 9 may cross to each other. The projection portion 9A may have a rib shape.

FIG. 12A is a perspective view illustrating an insulating sheet 10 according to an implementation, The insulation sheet 10 may position between the end plates 1 and 2 and the neighboring battery module 3 of the end plates 1 and 2. Further, the insulation sheet 10 may position between the end plates 1 and 2 and the cooling cover 34 of the neighboring battery module 3 of the end plates 1 and 2. The insulation sheet 10 may be in surface-contact with the cooling cover 34. Further, the insulation sheet 10 may be in surface-contact with the heat conductive plate 34B of the cooling cover 34.

The projection portion 10A may be formed on one surface of the insulation sheet 10.

A K area may be formed on the edge of the insulation sheet 10, with reference to FIG. 12A. In a case where the insulation sheet 10 has a square shape, the K area may be formed on the four portions. The K area may be a corner portion or an edge portion of the insulation sheet 10. The projection portion 9A may be formed on the K area. A plurality of projection portions 10A may be formed.

The projection portion 10A formed on the K area of the insulation sheet 10 allows the C area of the battery cell 32 which is in surface-contact with the cooling cover 34 of the neighboring battery module 3 of insulation sheet 10 to be bent or folded.

When the C area of the battery cell 32 which is in surface-contact with the cooling cover 34 is bent or fold, the C area may be separated or spaced apart from the J area of the cooling cover 34 and thus the risk that the outer appearance of the battery cell 32 is damaged may be reduced.

Figure 12B:
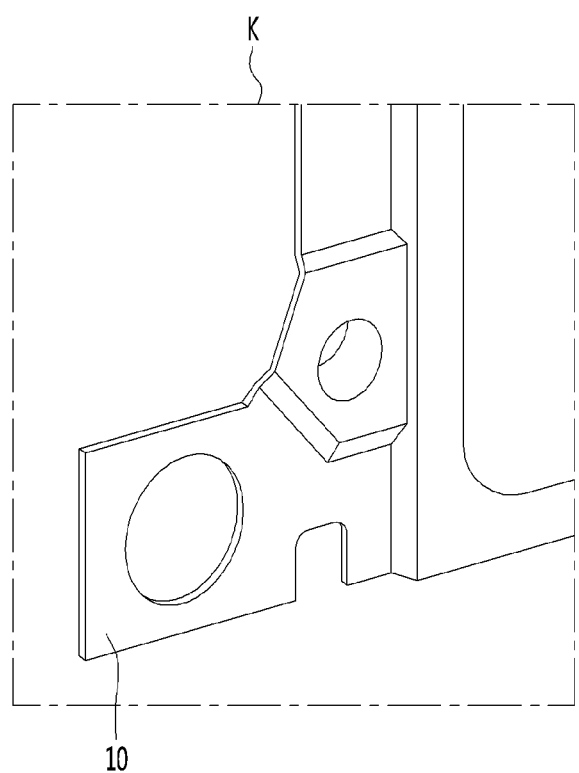
FIG. 12B is a diagram illustrating an example of an enlarged view of one possible configuration for the area denoted "K" in FIG. 12A.
Figure 12C:
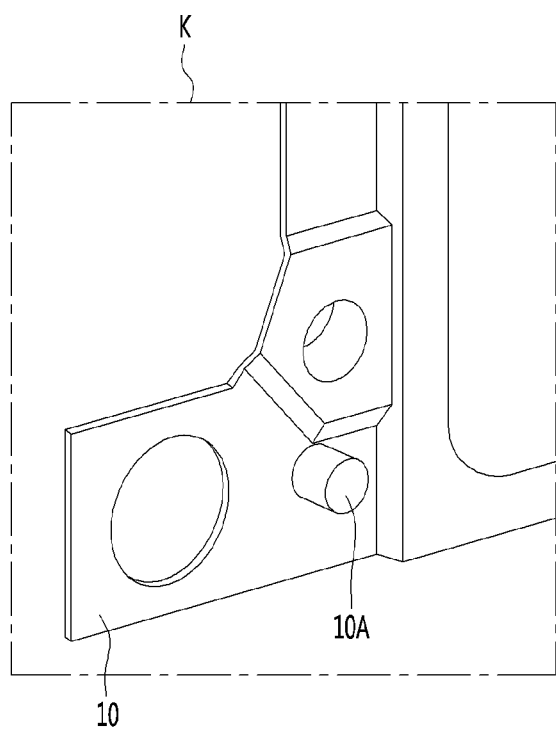
FIG. 12C is a diagram illustrating an example of an enlarged view of an implementation according to the present disclosure of the area denoted "K" in FIG. 12A.

FIG. 12B illustrates a configuration in which the insulation sheet 10 does not implement a projection portion (e.g., does not implement the projection portion 10A of FIG. 12C).

By contrast, according to implementations described herein, the insulation sheet 10 may form the projection portion 10A as illustrated in FIG. 12C. In some implementations, the projection portion 10A may have a rib shape. In addition, the projection portion 10A formed on one surface of the insulation sheet 10 may be projected in a convex shape and the other surface of the insulation sheet 10 is recessed in a concave shape.

Figure 13A:
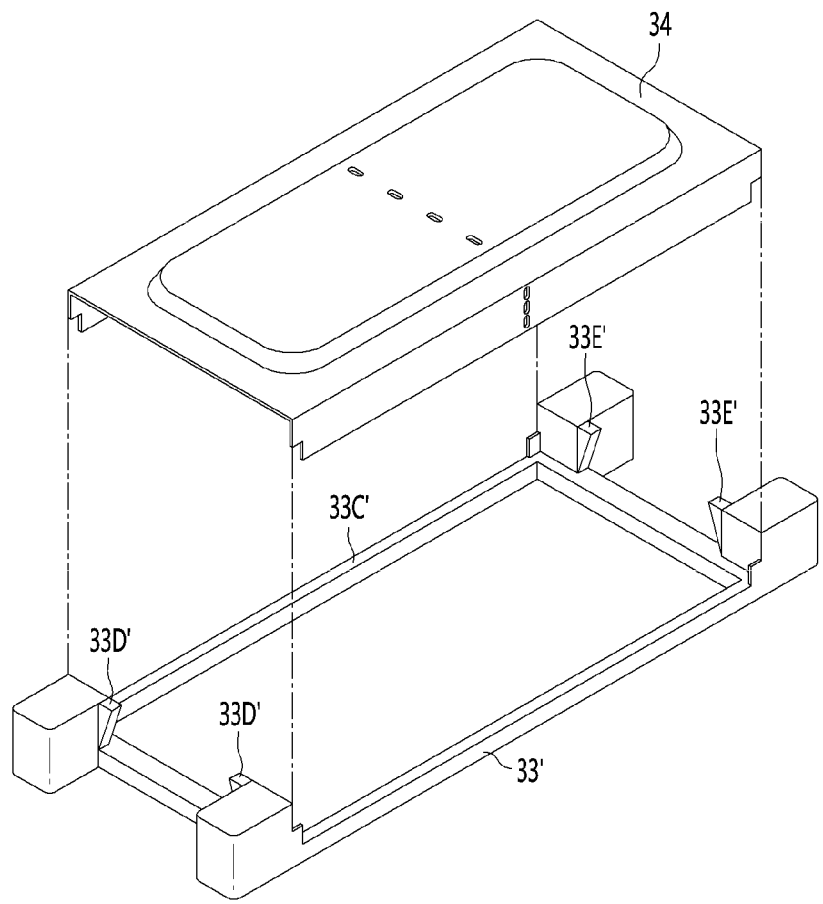
FIG. 13A is a diagram illustrating an example of a perspective view of a cartridge of a battery module and a cooling cover of a battery module according to another implementation.

FIG. 13A is an exploded perspective view illustrating a cartridge of a battery module and a cooling cover coupled with cartridge of the battery module according to another implementation.

Figure 13B:
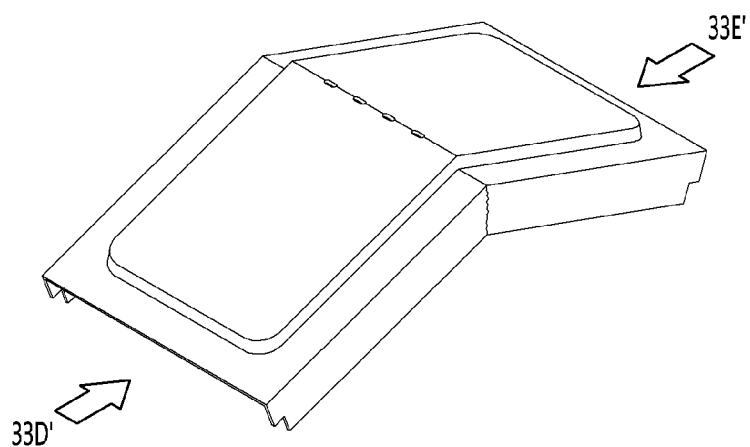
FIG. 13B is a diagram illustrating an example of a perspective view of a scenario where the cooling cover in FIG. 13A is bent.

FIG. 13B is a diagram illustrating a scenario where the cooling cover 34' of the other battery module 3' according to the other implementation receives pressure from the cartridge 33' of the battery module 3' and thus is bent.

The cartridge 33' according to the other implementation is configured to bend the cooling cover 34' of the battery module 3' including the cartridge 33, but may not be configured to bend the cooling cover 34' of the neighboring battery module 3'.

The cartridge 33' of the battery module 3' may include a seating portion 33C' in which the battery cell 32' is seated. A pressing portion 33D' is provided in one surface of the seating portion 33C'. A supporting portion 33E' may be provided in one surface of the seating portion 33C'.

The pressing portion 33D' and the supporting portion 33E' may be provided in one surface of the seating portion 33C'.

The battery cell 32' may be seated to be contacted on the one surface of the seated portion 33C'. The pressing portion 33D' may be formed on one surface of the seated portion 33C'.

The battery cell 32' may be seated to be contacted on the one surface of the seated portion 33C'. The supporting portion 33D' may be formed on one surface of the seated portion 33C'.

The pressing portion 33D' and the supporting portion 33E' are provided to be spaced apart from each other. The pressing portion 33D' and the supporting portion 33E' are projected to face each other.

The pressing portion 33D' may include a plurality of projecting portions which are formed on the seating portion 33C'.

The supporting portion 33E' may include a plurality of projecting portions which are formed on the seating portion 33C'.

The pressing portion 33D' is formed to be lengthened in the perpendicular direction to the longitudinal direction of the cartridge 33'.

The supporting portion 33E' is formed to be lengthened in the perpendicular direction to the longitudinal direction of the cartridge 33'.

The pressing portion 33D' may have a rib shape. The pressing portion 33D' may have a plurality of rib shapes.

The supporting portion 33E' may be a rib shape. The supporting portion 33E' may have a plurality of rib shapes.

The pressing portion 33D' and the supporting portion 33E' may have the same shape with each other.

The pressing portion 33D' of the battery module 3' may be in contact with one end of the cooling cover 34 which is included in the battery module 3.

The supporting portion 33E' of the battery module 3' may be in contact with the other end of the cooling cover 34 which is included in the battery module 3'.

The cooling cover 34 of the other neighboring battery module 3' of the battery module 3' may be positioned between the pressing portion 33D' and the supporting portion 33E' of the battery module 3'.

The gap that pressing portion 33D' and the supporting portion 33E' of the battery module 3' is spaced apart from each other may be only a length of the heat conductive plate of the cooling cover 34 included in the battery module 3'.

The cooling cover 34 included in the battery module 3' may be restricted in the longitudinal direction of the cooling cover 34 due to the pressing portion 33D' of the same battery module 3'.

The battery module 3' and the included cooling cover 34' may be restricted in the longitudinal direction of the cooling cover 34 due to the supporting portion 33E' of the same battery module 3'.

In a case where an impact is applied to the battery pack P' from the outside, the pressing portion 33D' of the battery module 3' may press one end or one side of the cooling cover 34 of the same battery module 3'. The cooling cover 34 of the same module receiving the pressure from the pressing portion 33D' of the battery module 3' may be bent as described in FIG. 13B.

In a case where an impact is applied to the battery pack P' from the outside, the pressing portion 33D' of the battery module 3' may press one end or one side of the cooling cover 34 in the same battery module 3'. The supporting portion 33E' of the battery module 3' may support the other end or the other side of the cooling cover 34' of the same battery module 3'.

Although implementations have been described with reference to a number of illustrative implementations thereof, it should be understood that numerous other modifications and implementations can be devised by those skilled in the art that will fall within the spirit and scope of the principles of this disclosure.

Accordingly, implementations disclosed in the present invention are for illustrating but not for limiting the technical scope of the present disclosure, and the scope of the technical spirits of the present disclosure is not limited by the implementations disclosed herein.

In addition, the protective scope of the present invention should be construed by the following claims, and all technical spirits within a scope equivalent to the protective scope will be construed as being included in the scope of the invention.

What is claimed is:

1. A battery pack comprising a plurality of battery modules in a stacked arrangement, the plurality of battery modules comprising a first battery module that comprises:
   at least one battery cell comprising a cell lead;
   a cartridge on which the at least one battery cell is mounted; and
   a cooling cover comprising a first cooling cover that is coupled to the cartridge and that covers the at least one battery cell,
   wherein the cartridge comprises:
      a seating portion configured to seat at least one battery cell,
      a pressing portion that disposed on the seating portion and that is configured to, based on an external force being applied to the seating portion, apply pressure to a first end of a second cooling cover of a second battery module that neighbors the first battery module in the stacked arrangement, and
      a supporting portion that is disposed on the seating portion, that is spaced apart from the pressing portion, and that supports a second end of the second cooling cover of the second battery module, wherein the pressing portion and the supporting portion protrude from one surface of the seating portion toward the cooling cover and face the one surface of the seating portion, and wherein the cooling cover comprises:
- a heat conductive plate that is positioned between the pressing portion and the supporting portion of the cartridge and that faces one surface of the at least one battery cell, the heat conductive plate having a first end portion that faces the pressing portion of the cartridge and a second end portion that is opposite to the first end portion and that faces the supporting portion of the cartridge, and
- at least one fastening plate that is bent from the heat conductive plate and that is coupled to the cartridge.

2. The battery pack according to claim 1, wherein at least one of the pressing portion or the supporting portion of the cartridge is formed to be elongated in a perpendicular direction to a longitudinal direction of the cartridge.

3. The battery pack according to claim 1, wherein the cooling cover defines at least one hole.

4. The battery pack according to claim 3, wherein the at least one hole is elongated in (i) a first direction parallel to a longitudinal direction of the cooling cover, or (ii) a second direction perpendicular to the longitudinal direction of the cooling cover.

5. The battery pack according to claim 3, wherein the at least one hole comprises a plurality of holes that are spaced apart in (i) a first direction parallel to a longitudinal direction of the cooling cover, or (ii) a second direction perpendicular to the longitudinal direction of the cooling cover.

6. The battery pack according to claim 3,
wherein the at least one hole is formed on at least one of the fastening plate or the heat conductive plate.

7. The battery pack according to claim 1,
wherein the at least one battery cell comprises a main body and a cell lead connected to the main body, and
wherein a stepped portion is formed in the seating portion of the cartridge, the stepped portion defining a space by which the cell lead is movable in a stacking direction of the at least one battery cell or in a perpendicular direction to the stacking direction of the at least one battery cell.

8. The battery pack according to claim 7,
wherein the stepped portion faces at least a portion of the cell lead.

9. The battery pack according to claim 1,
wherein the at least one battery cell comprises a first battery cell that is seated on the cartridge and a second battery cell that is in contact with the cooling cover, and wherein each of the plurality of battery modules further comprises a secondary cartridge positioned between the first battery cell and the second battery cell, the secondary cartridge configured to apply pressure on the first battery cell and the second battery cell in a state in which an external force is applied to the battery modules.

10. The battery pack according to claim 9, wherein the first battery module further comprises a buffering member that is disposed between the first battery cell and the second battery cell.

11. The battery pack according to claim 9,
wherein the secondary cartridge is disposed in parallel to the cartridge.

12. The battery pack according to claim 4, wherein the at least one hole comprises:
- a first hole defined at the fastening plate and elongated in the first direction parallel to the longitudinal direction of the cooling cover;
- a second hole defined at the fastening plate and elongated in the second direction perpendicular to the longitudinal direction of the cooling cover; and
- a third hole defined at the heat conductive plate and elongated in a third direction that is perpendicular to the second direction and the longitudinal direction of the cooling cover.

13. The battery pack according to claim 5, wherein the plurality of holes comprise:
- a plurality of first holes defined at the fastening plate and spaced apart from each other in the first direction parallel to the longitudinal direction of the cooling cover;
- a plurality of second holes defined at the fastening plate and spaced apart from each other in the second direction perpendicular to the longitudinal direction of the cooling cover; and
- a plurality of third holes defined at the heat conductive plate and spaced apart from each other in a third direction that is perpendicular to the second direction and the longitudinal direction of the cooling cover.

14. The battery pack according to claim 1, wherein the first end portion and the second end portion of the heat conductive plate are disposed at lateral ends of the heat conductive plate and spaced apart from each other along a longitudinal direction of the cooling cover, and
wherein the at least one fastening plate is bent from one or both of vertical ends of the heat conductive plate that are spaced apart from each other along a height direction perpendicular to the longitudinal direction of the cooling cover.

* * * * *